United States Patent
Martinie

[11] 3,813,135
[45] May 28, 1974

[54] SELF ORIENTING CONTOURED HOLLOW BALL FOR HIGH SPEED BEARING

[75] Inventor: Howard M. Martinie, King of Prussia, Pa.

[73] Assignee: SKF Industries, Inc., King of Prussia, Pa.

[22] Filed: Feb. 27, 1973

[21] Appl. No.: 336,238

[52] U.S. Cl. .............................................. 308/188
[51] Int. Cl. ......................................... F16c 33/64
[58] Field of Search .................................... 308/188

[56] References Cited
UNITED STATES PATENTS
3,337,278   8/1967   Vigh .................................. 308/188
3,587,154   6/1971   Potter ............................... 308/188

Primary Examiner—Charles J. Myhre
Assistant Examiner—Frank Susko
Attorney, Agent, or Firm—Howson and Howson

[57] ABSTRACT

For a rolling bearing assembly comprising inner and outer rings having spaced apart raceways, a plurality of ball elements for the annular space between the raceways, at least one of said ball elements being hollow and including a circumferentially extending heavy wall zone section having a maximum wall thickness greater than the maximum wall thickness of diametrically opposed thin wall zone sections whereby upon operation of the bearing the ball element rotates about a predetermined fixed axis and the heavy wall zone section confronts the raceways at the point of maximum loading.

6 Claims, 9 Drawing Figures

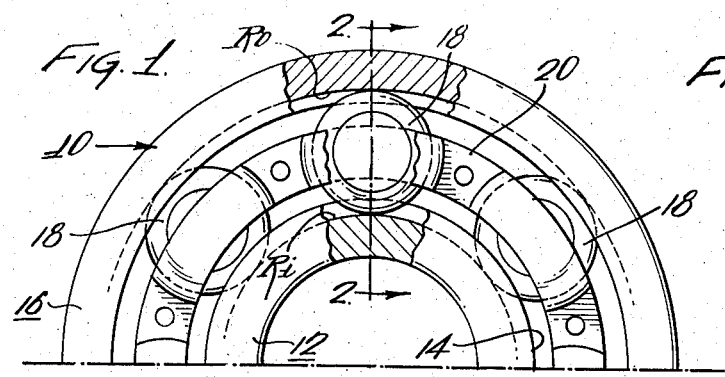
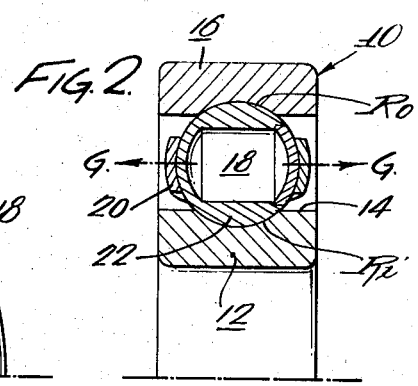
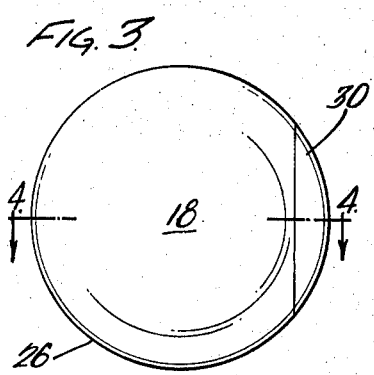
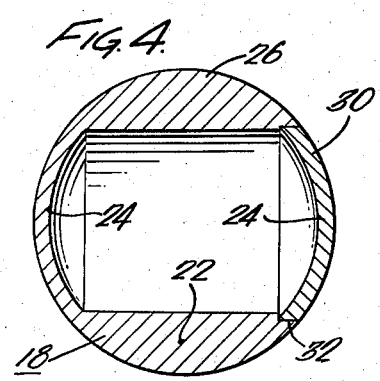
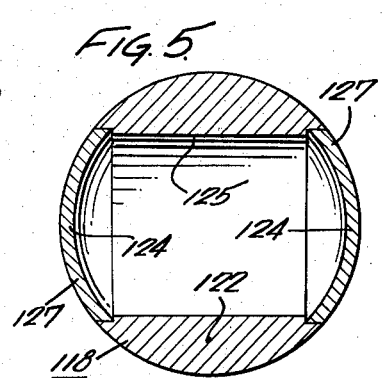
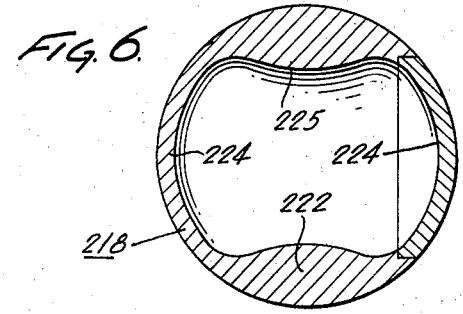
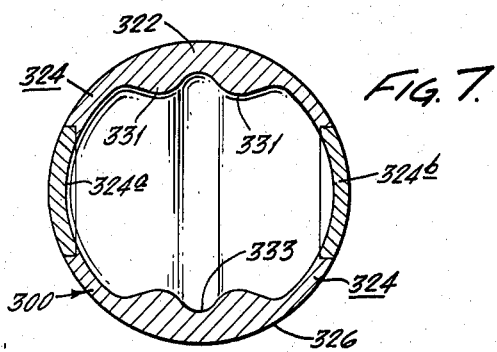
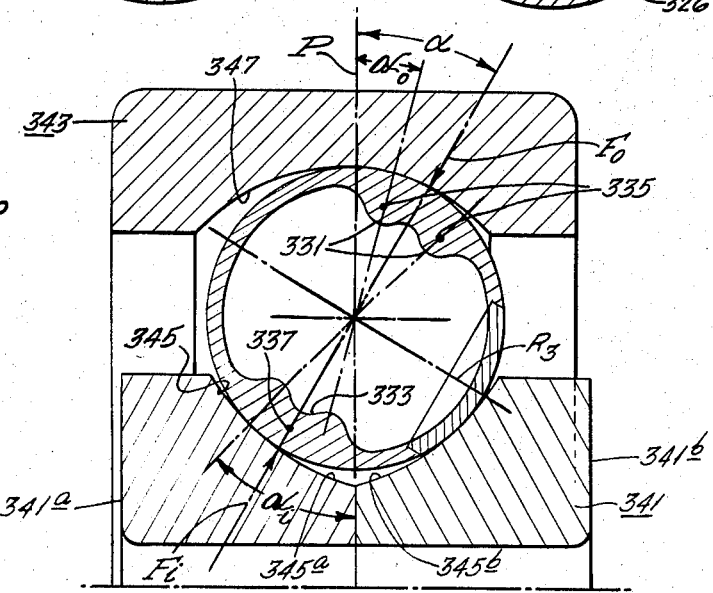

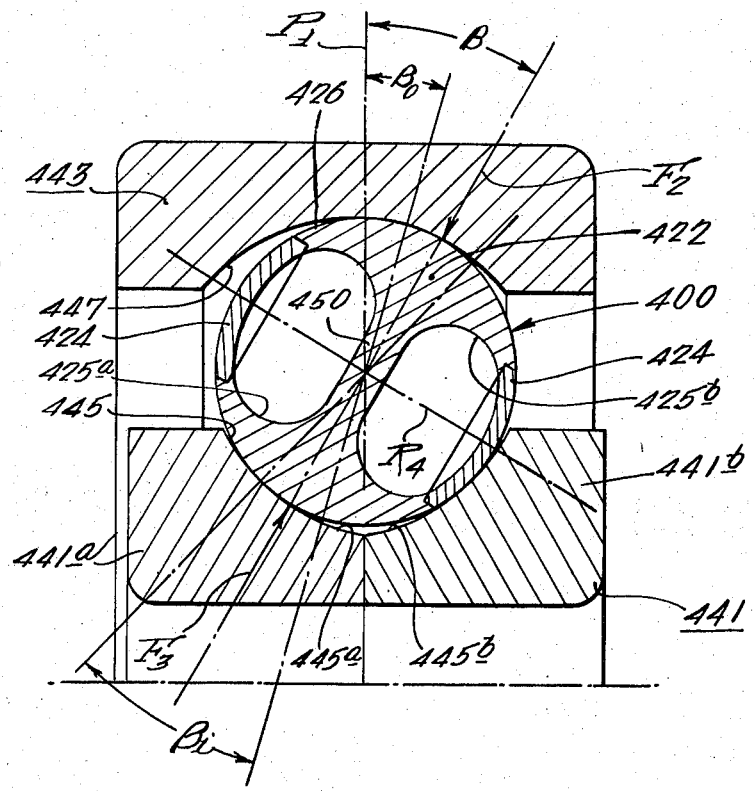

SELF ORIENTING CONTOURED HOLLOW BALL FOR HIGH SPEED BEARING

The present invention relates to rolling bearings and more particularly to a new and improved ball bearing design particularly adapted for high speed applications such as in aircraft turbine engines.

One of the problems in using conventional ball bearings in high speed applications is the fact that they experience short fatigue lives at high speeds. In fact, the predicted fatigue life of conventional rolling bearings is so low that their use becomes impractical due to failure after a comparatively short period of use. It has been found that the cause of failure is that the centrifugal loading on the rolling elements is so great that it far exceeds the applied loading.

The present invention provides an improved ball bearing design which eliminates the problem of early failure in high speed applications by reducing the mass of the ball elements. More specifically, the ball is a hollow element having a circumferentially extending heavy wall zone section and diametrically opposed thinner wall zone sections. The rotational axis of the ball is coincident with an axis through the geometric center of the thin wall zone sections about which the heavy wall zone section is symmetrical. By this arrangement, the ball element is heavier in one plane and, consequently, it will rotate about an axis perpendicular to that plane. In other words, the centrifugal force will cause an unbalanced torque couple until the plane of greatest mass is aligned perpendicular to the axis of rotation. In operation, therefore, the load will be carried by the heavy wall zone sections so that it has maximum stiffness or rigidity in the load zone and a minimum weight by reducing the section of the ball in the unloaded zone. It is noted that the thin-walled section of the ball is designed to be strong enough to carry the load during startup.

Hollow ball bearings per se are not new to the art. For example, hollow balls having a uniform wall section throughout which may be formed by welding a pair of cupshaped hemispherical elements along a circumferential equator line have been proposed. However, these hollow balls have certain disadvantages and drawbacks in high speed application. For example, in order to withstand maximum loading in aircraft engine turbines, the wall section and the size of the ball have to be of a certain dimension much larger than the proposed ball size of the present invention, thus requiring greater overall size of the bearing and without a significant reduction in mass. The ball of uniform wall thickness has to be of a greater overall mass than a ball of the present invention to withstand comparable loading. Furthermore, these balls are not self-orienting and thus are subject to failure along the weld joing when the load acts in the direction of the weld joint. Additionally, some difficulty has been experienced in balancing these ball elements properly.

Other proposed ball designs to reduce mass have consisted of a ball with a drilled through hole. These balls, however, require some type of retainer with an axle extending through the hole in order to properly align the balls during startup operation. There is a limit in the hole size in an angular contact bearing before the axle will contact the side wall of the hole. Contact of the axle and ball is of course undesirable since it impedes normal rotation of the balls and causes undue wear leading to premature failure of the balls.

With the foregoing in mind, it is an object of the present invention to provide a novel self-orienting ball particularly adapted for use in high speed bearing applications which operates at significantly lower temperatures and produces a substantially prolonged fatigue life as compared with conventional ball bearings and the hollow ball-type elements discussed above.

These and other objects of the present invention and the various features and details of the operation and construction thereof are hereinafter more fully set forth with reference to the accompanying drawings, wherein:

FIG. 1 is a fragmentary side elevational view of a bearing assembly incorporating ball elements constructed in accordance with the present invention;

FIG. 2 is a sectional view taken on line 2—2 of FIG. 1;

FIG. 3 is an enlarged view of a ball element in accordance with the present invention;

FIG. 4 is a sectional view showing the details of construction of a ball element taken on line 4—4 of FIG. 3;

FIG. 5 is a sectional view similar to FIG. 4 showing a modified form of ball element in accordance with the present invention;

FIG. 6 is a sectional view of another form of hollow ball element in accordance with the present invention;

FIG. 7 shows still another embodiment of hollow ball;

FIG. 8 shows the ball of the form of FIG. 7 in a typical operating position in an angular contact bearing assembly; and FIG. 9 shows still a further embodiment of self-orienting ball for an angular contact bearing assembly.

Referring now the the drawings, and particularly to FIG. 1 thereof, there is illustrated one embodiment of self-orienting contoured ball bearing assembly in accordance with the present invention generally designated by the numeral 10.

The bearing assembly 10 illustrated in FIG. 1 comprises an inner ring 12 having a circumferentially extending arcuate surface 14, an inner raceway $R_i$, an outer ring 16 having an arcuate raceway $R_o$, a plurality of balls 18 in the annular space between the rings engaging the raceways and a conventional cage 20 for circumferentially spacing the balls 18.

In the embodiment illustrated in FIGS. 3 and 4, the ball consists of an annular heavy wall zone section 22 which in cross section is of circular segmental configuration, and diametrically opposed thin wall zone sections 24 of arcuate configuration and defining with the zone section 22 a ball element having a truly spherical outer surface 26. In the present instance, one of the thin wall zone sections 24 is formed integrally with the heavy wall zone section 22, and the other thin wall zone section is in the form of a cap 30 which may be assembled by beam or diffusion welding so that the weld effects are concentrated at the circumferential joint or seam at the periphery of the cap 30. In the present instance, the outer side edge portion of the heavy wall zone section is formed with a circumferential shoulder as at 32 to define a seat for the cap 30.

The ball 18 may be made from a solid spherical member by turning on a lathe using a contoured tool to form the heavy wall zone section 22 and one of the thin wall zone sections 24 as one piece. The hollow interior may also be formed by drilling. The thin wall zone sections are of a suitable cross section for a given size bearing capable of withstanding static load and loads acting on the bearing during startup. The ratio of thickness of the heavy wall section to the thin wall section is preferably in a given range depending upon the particular application for which the bearing assembly is designed. Thus, a bearing with a light startup and/or reversing thrust load and heavy applied loads would have a relatively light thin wall section to allow maximum weight reduction and maximum high speed characteristics. On the other hand, in an application where the bearing is subjected to a high startup or reversing thrust conditions, the balls would have a somewhat heavier thin wall section. In this manner the ball can be designed to optimize weight reduction and load carrying ability for a given application. For example, in a ball 18 of the type described above, the mass of the heavy wall zone section 22 in relation to the entire mass of the ball is preferably in the ratio of about 2.5 to 5:1.

Consider now operation of a bearing having self-orienting ball elements in accordance with the present invention. At startup, the balls are randomly oriented. Now as the balls rotate during operation of the bearing, the balls tend to rotate about an axis perpendicular to a plane wherein the mass of the ball is concentrated; that is, about the axis G—G. This result by reason of the fact that the centrifugal force causes an unbalanced torque couple until the plane of greatest mass is aligned perpendicular to the axis of rotation of the ball. In this position, the heavy wall zone section 22 confronts the raceways. It is indicated that bearings of this type generate less heat, have a greater fatigue life and are capable of carrying greater dynamic loads than solid balls. In operation, the ball orients relative to the raceways so that there is no contact of the weld joint or seam and the raceways, thus minimizing the risk of failure. There are no stress risers in load zone which is characteristic of some prior hollow ball elements such as those having a uniform wall thickness throughout. Furthermore, the end grain of the ball may be located out of the load zone by this construction.

There is illustrated in FIG. 5 a modified form of self-orienting ball generally designated by the numeral 118. This ball is also adapted for use in a bearing assembly of the type shown in FIG. 1, and also consists of a heavy wall zone section 122 diametrically opposed and thin wall zone sections 124 defining a hollow interior 125. In the present instance the ball is a three piece element wherein the sections 124 are in the form of arcuate end caps 127 welded to the heavy wall zone section 122. The hollow interior 125 of the sphere may be formed by through-drilling or blind drilling, and the cover elements or end caps 127 are preferably secured by an electron beam or diffusion weld. In this type of construction the end grain may be eliminated entirely.

The ball shown in FIG. 6 is similar in construction to that of FIG. 4 consisting of a heavy wall zone section 222, diametrically opposed thin wall zone sections 224 defining a hollow interior 225. The heavy wall zone section 222 and one of the thin wall zone sections 224 are integral and may be formed from a solid spherical member by a turning method as described above. The other thin wall zone section 224 is in the form of a cap secured in place by beam or diffusion welding. In the present instance, the heavy wall zone section 222 is more of an oval-shaped cross section to concentrate the mass more heavily in a plane transverse to the axis of rotation in line with the application of load on the ball during operation. As noted previously, the ratio of thickness of the heavy wall section to the thin wall section may be selectively varied depending on the particular type of application for which the bearing assembly is designed. As set forth previously, the mass of the heavy wall zone section 222 in relation to the mass of the entire ball may be in the ratio of 2.5 to 5:1.

There is illustrated in FIG. 7 a ball constructed in accordance with the present invention which is particularly suited for use in angular contact bearing assemblies. In these applications the contact angle between the ball and inner ring and ball and outer ring may vary depending on variations in the centrifugal loading. Thus the ball is designed to provide maximum mass concentration at the area of maximum stress. To this end the ball 300 comprises an annular circumferentially extending heavy wall zone section 322 and diametrically opposed thin wall zone sections 324 of an arcuate configuration thereby defining a ball element having a truly spherical outer surface 326. This ball is similar to that shown in FIG. 5 in that the thin wall zone sections 324a and 324b are in the form of an end cap which is secured in place by diffusion or beam welding.

The rolling elements described above are adapted for use in a rolling bearing assembly having inner and outer ring members 341 and 343, respectively, having confronting raceways 345, 347. In the illustrated embodiment of FIG. 8, the inner ring member comprises a pair of ring segments 341a and 341b, each having arcuate raceway portions 345a and 345b defining the inner raceway. The inner ring segments may be supported in abutting relation by conventional means. In the present instance, the heavy wall zone section 322 is of an undulating configuration on its inner wall defining a pair of radially inwardly projecting annular ribs 331 spaced apart by an annular groove or depression 333. Thus the cross section of the heavy wall zone section through the ribs 331 as at 335 is greater than the cross section through the groove 333 as at 337.

In these assemblies, the rolling elements may be randomly oriented and when the bearing is subjected to load, for example a thrust load, the balls orient themselves so that they rotate about an axis $R_3$. In this position, the point of maximum load on the bearing acts in the region of the ball which has the greater cross section (see FIG. 8), the point of maximum loading on the balls being indicated by the arrows designated $F_i$ and $F_o$. The normal contact of an angular contact bearing changes under high speed due to the centrifugal load on the ball. Thus the nominal angle $\alpha$ measured from a radial plane P is reduced at the outer contact angle $\alpha_o$ and increased at the inner contact angle $\alpha_i$. Thus, in accordance with this embodiment of the invention, the undulating configuration provides the maximum cross section at the plane of loading and also retains the advantage of providing a ball of minimum weight.

There is illustrated in FIG. 9 a still further embodiment of ball constructed in accordance with the present invention which is particularly suited for use in angular contact bearing assemblies. In the present instance, the rolling bearing assembly consists of inner and outer ring members 441 and 443, respectively, having confronting raceways 445 and 447. As in the previously described embodiment of FIG. 8, the inner ring member 441 may comprise separate ring segments 441a and 441b, each having arcuate raceway portions 445a and 445b defining the inner raceway. These inner ring segments may be supported in abutting relation by conventional means.

The rolling element which is in the form of a ball 400 consists of an annular circumferentially extending heavy wall zone section 422 and diametrically opposed thin wall zone sections 424. In the present instance the thin wall zone sections 424 are of a predetermined uniform wall thickness, and each is in the form of an end cap secured to the heavy wall zone section by diffusion or beam welding thereby defining a ball element having a truly spherical outer surface 426. In the present instance, the heavy wall zone section has a center web 450 so that the heavy wall zone section and web 450 define a cross section of generally I-shaped configuration. The web also divides the interior of the ball into a pair of spaced hollow interior portions 425a and 425b.

In an assembly of this type, the balls, which may be randomly orientated when the bearing is not under load, orient themselves to that they rotate about an axis $R_4$ when the bearing is subjected to a load such as a thrust load. This is due to the fact that the mass is more heavily concentrated in a plane transverse to the axis of rotation in line with the application of load on the ball during operation. Thus the point of maximum load on the bearing acts in the region of the ball which has the greatest cross section, the web 450 also serving to support load when the bearing is oriented as illustrated in FIG. 9. In this position, the point of maximum loading on the balls is as indicated by the arrows $F_2$ and $F_3$. Additionally, as noted, the nominal contact of an angular contact bearing of this type changes under high speed due to centrifugal loading on the ball. Thus the nominal contact angle $\beta$ measured from a radial plane $P_1$, which is perpendicualr to the axis of the bearing, is reduced at the outer contact angle $\beta_o$, and increased at the inner contact angle $\beta_i$. By this configuration, there is provided with maximum cross section at the plane of loading while retaining the advantage of providing a ball of minimum weight.

I claim:

1. For a high-speed rolling bearing assembly comprising inner and outer rings having spaced apart raceways, a plurality of ball elements for the annular space between the raceways, at least one of said ball elements being made of a solid member and suitably formed by removal of material so that it is hollowed and having at least one cap member closing the opening to the hollowed interior so that said ball element includes a circumferentially extending heavy wall zone section having a wall thickness greater than the maximum wall thickness of the diametrically opposed thin wall zone sections, said zones being oriented so that the ball element is symmetrical about a predetermined axis and said heavy wall zone section being remote from the axis of symmetry so that the mass moment of inertia of the ball element is greatest about the axis of symmetry whereby upon operation of the bearing during start up, the ball element rotates randomly and under operating loads and speeds orients itself so that the ball element rotates about the predetermined axis of symmetry and the heavy wall zone section confronts the raceways, at least one of said thin wall sections including said cap member.

2. A ball element as claimed in claim 1 wherein the heavy wall zone section is of a circular segmental configuration in cross section.

3. A ball element as claimed in claim 2 wherein one of the thin wall zone sections is formed integrally with said heavy wall zone section and the other of said thin wall zone sections includes said cap welded to the ball element at its outer periphery.

4. A ball element as claimed in claim 1 wherein the heavy wall zone section is of generally oval-shaped cross section.

5. A ball element as claimed in claim 1 wherein the heavy wall zone section is of an undulating configuration on its inner peripheral surface defining a pair of radially inwardly projecting annular ribs spaced apart by an annular groove of smaller cross section than a section through said annular ribs.

6. A ball element as claimed in claim 1 including a center web whereby the heavy wall section and web define a cross section of generally I-shaped configuration.

* * * * *